_US005805284A_

United States Patent [19]
Lacey

[11] Patent Number: 5,805,284
[45] Date of Patent: Sep. 8, 1998

[54] OPTICALLY VERIFIED GLIDE

[75] Inventor: Christopher A. Lacey, San Diego, Calif.

[73] Assignee: Phase Metrics, Inc., San Diego, Calif.

[21] Appl. No.: 797,536

[22] Filed: Feb. 7, 1997

[51] Int. Cl.⁶ .................................................. G01B 9/02
[52] U.S. Cl. ............................................. 356/357; 356/360
[58] Field of Search ..................................... 356/345, 357, 356/359, 360, 28.5, 355; 73/105, 104

[56] References Cited

U.S. PATENT DOCUMENTS

| | | | |
|---|---|---|---|
| 5,457,534 | 10/1995 | Lacey et al. | 356/357 |
| 5,504,571 | 4/1996 | Eckerman et al. | |
| 5,581,021 | 12/1996 | Flechsig et al. | 73/105 |

*Primary Examiner*—Robert Kim
*Attorney, Agent, or Firm*—Blakely Sokoloff Taylor & Zafman

[57] ABSTRACT

An efficient method and apparatus for taking the data needed for a glide test; the data includes measuring flying height of a slider over a regular rotating disk and measuring piezoelectric contact with the disk. An optical system provides a beam of light. To measure the flying height, part of the beam of light is reflected from a surface of the transparent slider. Another portion of the beam is reflected from the surface of a rotating disk. The two beams are transferred through an optical system and imaged onto a CCD camera which converts the separation of intensity maxima or intensity minima into information regarding the air gap separating the slider and the disk. A piezoelectric sensor on the slider measures slider contact with the disk. A processor combines data from the piezoelectric sensor with data from the CCD camera to measure disk asperities.

18 Claims, 3 Drawing Sheets

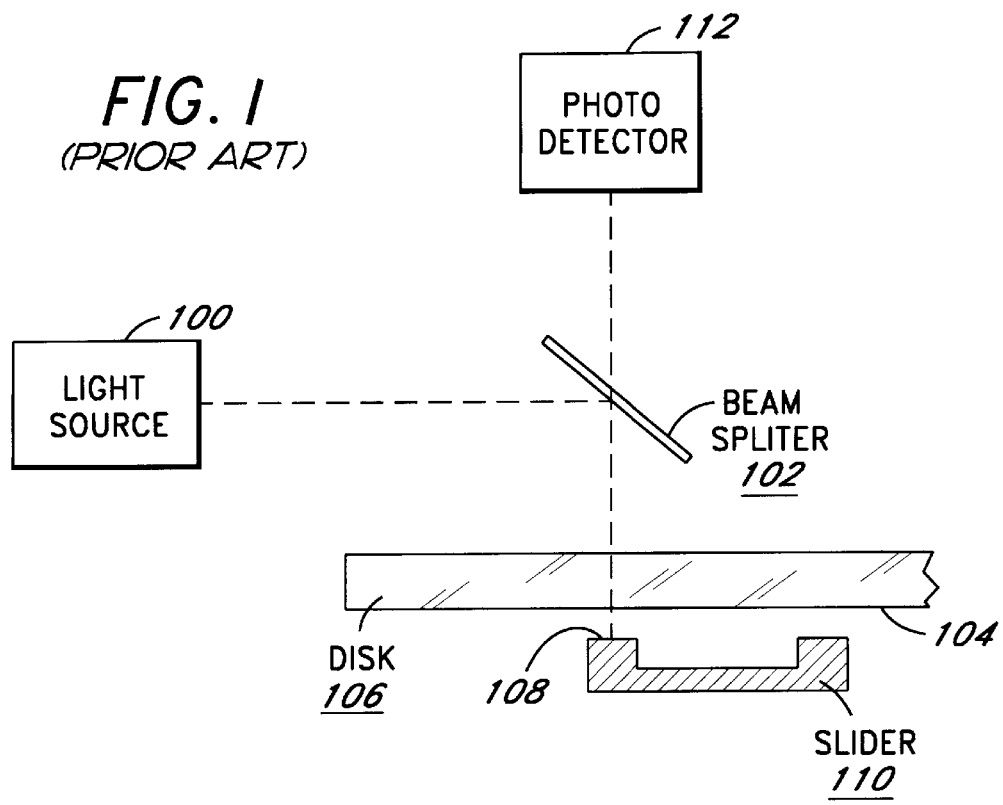
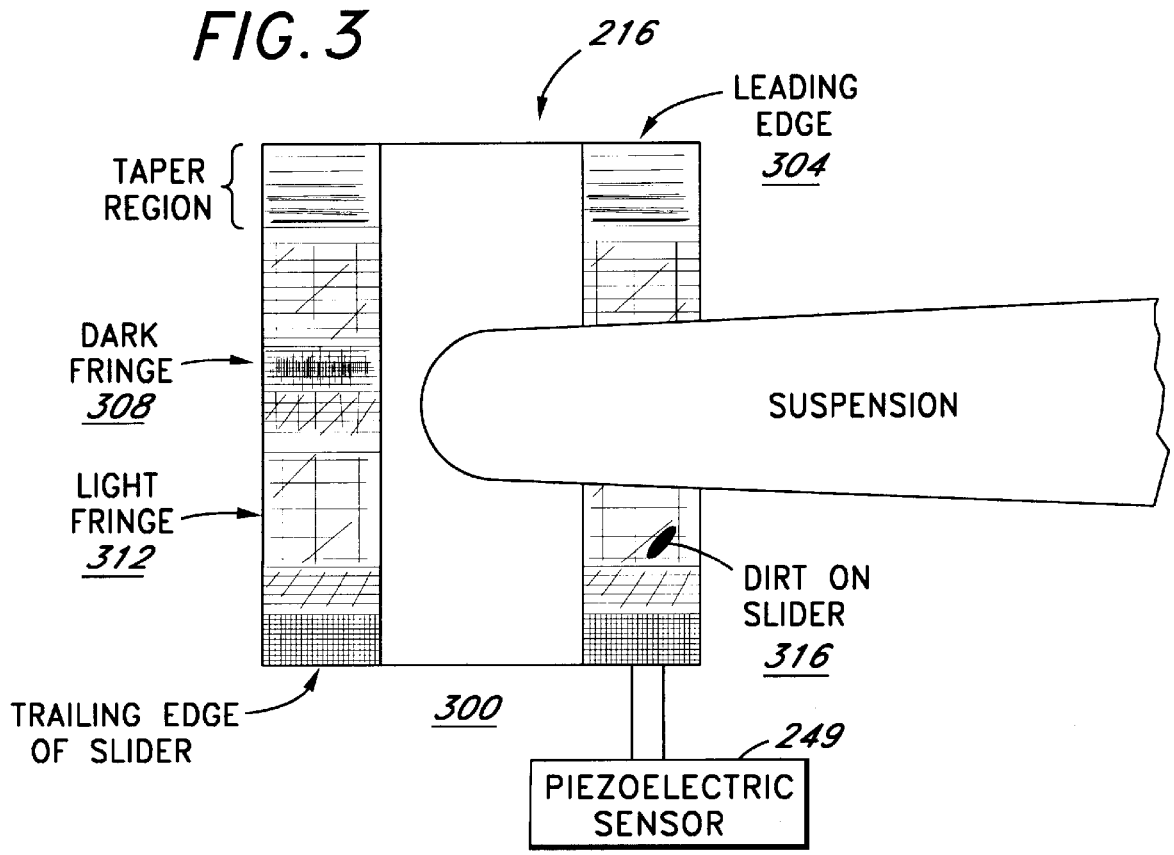

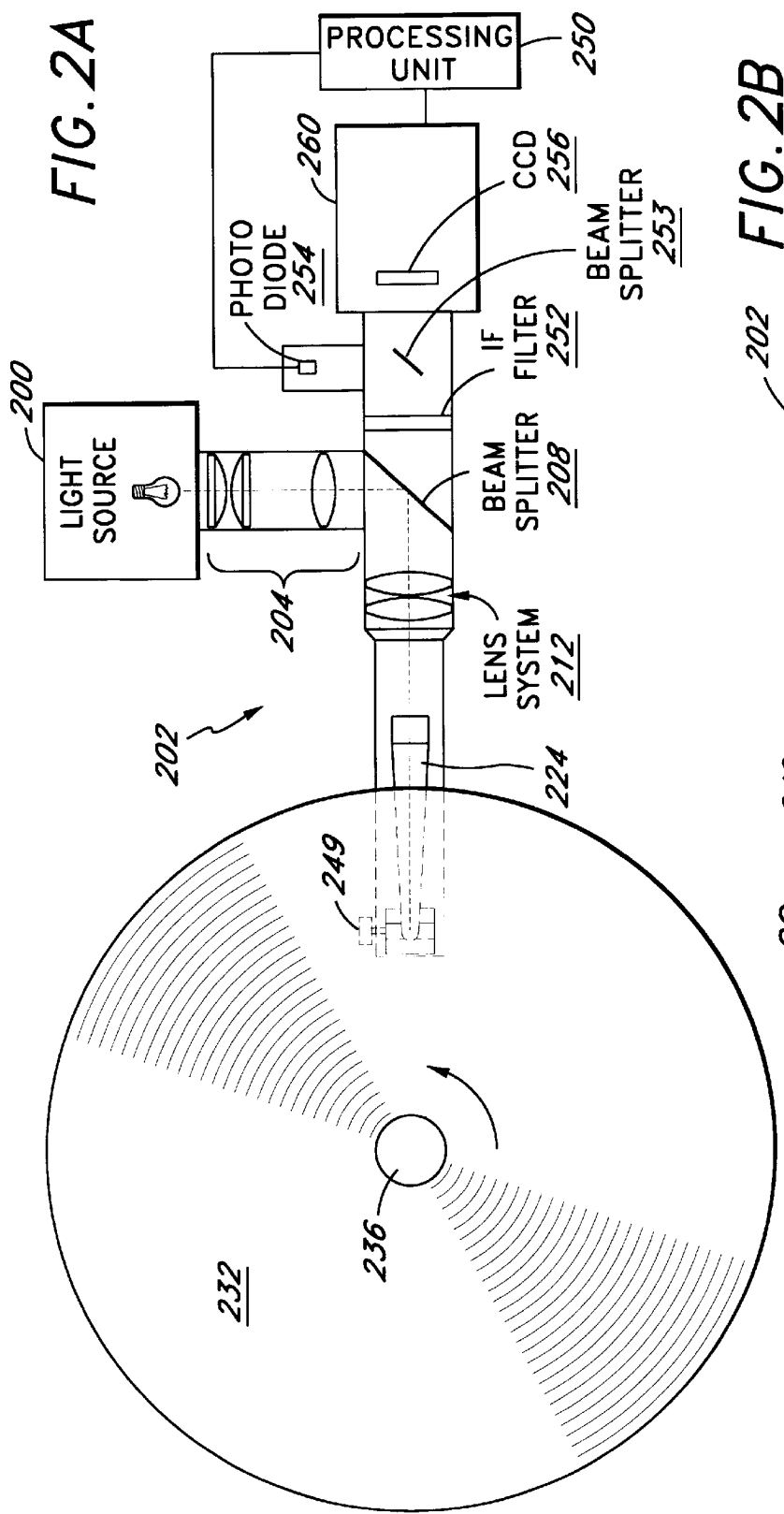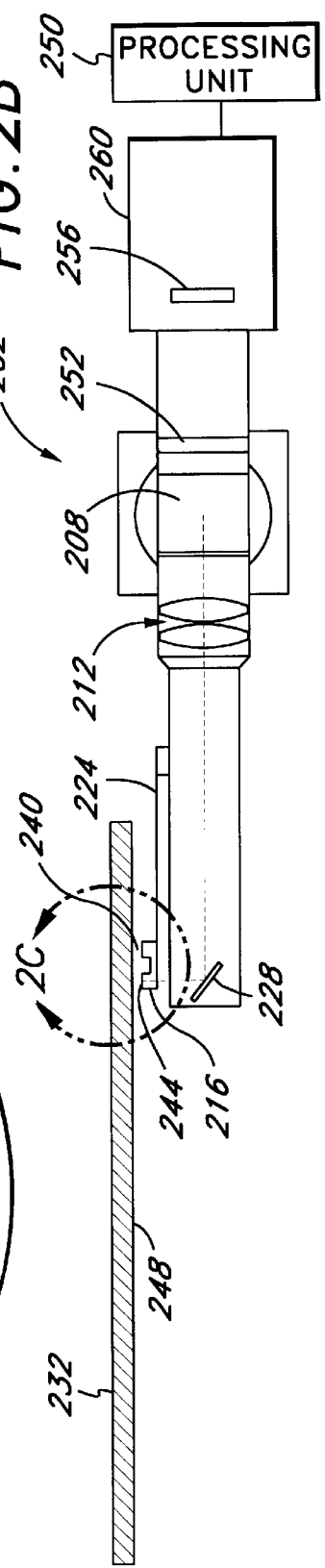

OPTICALLY VERIFIED GLIDE

BACKGROUND OF THE INVENTION

1. Field of the Invention

The present invention relates to an optical system for measuring the fly height of a transparent slider while glide tests are done on a magnetic disk.

2. Description of Related Art

In recent years microcomputer equipment such as personal, desk top or lap top computers have become extremely popular for a wide range of business, educational and recreational uses. Such computers typically include a main central processor having one or more memory storage disks for the storage of data. The storage disk or disks are commonly provided as part of a so-called Winchester disk drive unit, sometimes referred to as a "hard" disk. Hard disk systems typically consist of one or more disks which are mounted and rotated by a common spindle. Each disk contains a plurality of narrow, closely spaced concentric tracks wherein serial data can be magnetically recorded for later recovery by a transducer positioned with respect to the desired track. The transducer is integrated into a slider that is typically gimbal mounted to a flexure which is attached to a rotary arm. The arm is pivoted by a voice coil motor which moves the slider radially across the surface of a magnetic disk from one data track to another. During operation the air bearing surface of the slider and the rotation of the magnetic disk causes the transducer to be hydrodynamically lifted above the surface of the recording medium by an air bearing. This hydrodynamic lifting phenomena results from the flow of air produced by the rotating magnetic disk. It is this air flow which causes the slider to "fly" above the disk surface.

In magnetic recording technology, it is continually desired to improve the density at which information can be recorded and read. The total memory storage capacity or recording density is proportional to the number of tracks on the surface of a disk. The number of tracks is, in turn, dependent upon the width of the tracks which is directly proportional to the air bearing height.

The current trend in the industry is toward increasing storage capacity by reducing the height of the air bearing. Reducing the slider flying height down to near-contact levels is currently one of the major areas of focus in the modern magnetic storage industry. The thickness of the air bearing can vary depending upon the spring rate of the suspension arm, aerodynamic characteristics of the slider and other factors.

In order to reduce the flying height, it is desirable to measure the height of the air bearing for each gimbal assembly to insure that the air bearing thickness complies with manufacturing specifications. Various systems have been developed to detect the microinch and sub-microinch air bearing thicknesses typically created in hard disk drive units. One technique, the capacitance method, uses changing capacitance to determine the slider/disk spacing. A standard production disk can be used in the capacitance method but a second transducer must be mounted on the slider, thereby modifying the device under investigation.

A second technique uses a dual beam laser Doppler vibrometer to measure the spacing of a standard slider over a real disk. The Doppler vibrometer requires a smooth reflective area on the back of the slider to be accessible to the laser beam. On many production heads, the back of the slider is not easily accessible. Furthermore, air bearing surface variations such as twist and crown combined with thermally induced variations in slider thickness produce relatively large measurement errors in Doppler vibrometer measurements.

A third technique, white light interferometry, sends a light beam through a glass disk. A portion of the light beam is reflected off the disk and a second portion is reflected off the slider. An interference pattern results from the two reflected beams. This interference pattern is used to measure the air gap spacing. White light interferometry technique requires that the standard production magnetic disk be replaced with a glass or quartz disk in order to measure the absolute flying height and this cannot be used to test flying height over production disks.

Each of these three systems has been used extensively in laboratories for the design and development of slider geometry, however, in actual production, head manufacturers have traditionally chosen white light interferometric techniques to measure the flying height of heads. White light interferometric techniques, unlike capacitance techniques and Laser Doppler Vibrometry techniques, do not require the modification of the slider or suspension to obtain a direct measurement of head or media spacing.

FIG. 1 illustrates a diagram of a prior art white light interferometer used to measure slider disk spacing. Illumination from a light source 100 is directed by a beam splitter 102 toward the slider/disk interface. The light beam passes through a glass disk 106. A portion of the incident light is reflected off the lower surface 104 of the disk 106, and a portion of the remaining light is reflected off the top surface 108 of the opaque slider 110. The two reflected beams recombine and form an interference pattern which varies in intensity as a function of the wavelength of light, the slider/disk spacing, and the intensity of each of the two reflected waves. The resulting intensity distribution is measured by a photodetector 112 and analyzed to determine the slider/disk spacing. The arrangement of the prior art system shown in FIG. 1 requires that disk 106 be made of a transparent material.

One problem with the white light interferometric test is that it cannot be used in a glide test. Glide tests are used to measure the smoothness of a disk. In a glide test, a glide head is typically mounted with a piezo-electric sensor which produce a signal when the flying head contacts the disk. These readings give an indication of the magnitude of defects or asperities in the disk.

In order to determine the smoothness of a disk from a glide test, information relating to the average flying height of the glide head is needed. A fixed flying height of the glide head cannot be assumed, because the flying height may vary from gimbal to gimbal due to factors such as damage to the slider, air bearing surface, spring distortions, and contamination.

Traditional methods of conducting a glide test thus must be done in two steps. In the first step, the glide head is calibrated and the air bearing thickness of each gimbal assembly is measured by inserting the suspension arm into a test unit equipped with a transparent glass calibration disk. A light beam is directed through the glass disk and onto the slider. The reflection of light from the inner surface of the glass disk interferes with the reflection from the slider generating an interference pattern that is detected by a photodetector. The thickness of the air bearing is computed from this interference pattern.

The second step of the glide test involves replacing the glass disk with a disk to be tested. A piezoelectric on the slider measures the contacts between the slider and the disk.

This information is combined with information from the first step which measured the average flying height obtained from measurements of the gimbal assembly.

The two step process for performing a glide test requires a disk change and two sets of measurements taken at different times. The first flying height measurements are taken with a transparent calibration disk. The second, piezo-electric contact measurements are taken with a regular opaque disk. The two step process is cumbersome, inefficient, and must be repeated because over time, the flying height of the glide head changes requiring recalibration of the glide head.

A second method of obtaining glide height information involves flying a glide head over a "calibration disk" with bumps of known height. A piezo transducer on the glide head provides signals which are correlated to the known bump heights of the calibration disk. However, the trend towards extremely small flying heights and corresponding low glide heights makes it very difficult to fabricate and maintain reliable calibration bump disks.

Both described systems or methods use piezo electric transducer to detect slider to disk contact. Calibration of a system to determine the relationship between piezo output and asperity height can be difficult. Furthermore, the output from the piezo can be affected by many factors such as electrical noise, mechanical stability of the piezo mounting, stress induced by electrical connections to the piezo, electrical gain and other factors. Finally, a piezo electric transducer mounted on the glide head substantially increases the cost of the heads.

Thus a method for determining average glide heights while simultaneously taking piezo-electric measurements of slider-disk contacts to compute disk asperities is desirable. It is also desirable to use optical means to detect slider disk contacts to eliminate the need for a piezo-electric sensor.

SUMMARY OF THE INVENTION

The present invention is a glide tester which contains a transparent slider that "flies" above a hard disk. The glide tester identifies imperfections in the disk by sensing contact between the slider and an asperity on the disk surface. Contact may be sensed with a piezo electric transducer or by optically measuring fluctuations in flying height. The tester utilizes a transparent slider to determine the flying height during a glide test. An optical assembly illuminates the slider/disk interface from above and images an interface pattern from the interface onto a CCD camera. The CCD camera output is captured, digitized and stored. Software analysis of the captured image yields the average flying height of the slider during the glide test. The flying height information can be used to verify the flying height to insure that the glide test is being performed within acceptable limits.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 illustrates a prior art apparatus for measuring the spacing between a slider and a disk.

FIG. 2A illustrates a top view schematic of the optical layout for the optically verified glide of the present invention;

FIG. 2B illustrates a side view schematic of the optical layout for the optically verified glide of the present invention;

FIG. 3 is an image of the transparent slider showing interference fringes which may be formed on the transparent slider.

DETAILED DESCRIPTION OF THE INVENTION

Figure 2C:
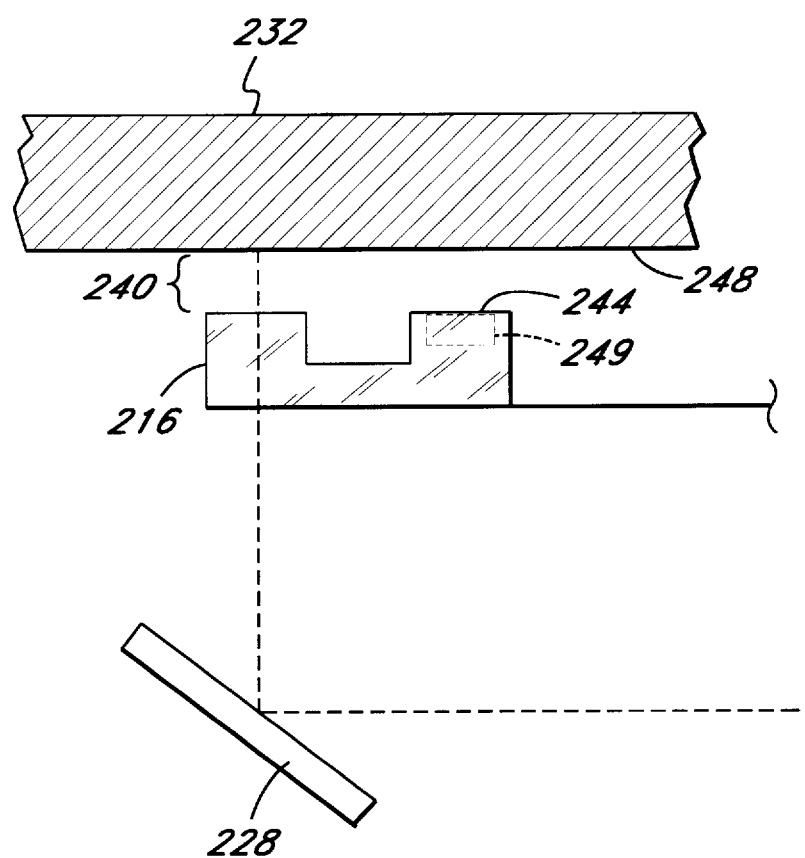
FIG. 2C is an enlarged view of the slider-disk interface of the current invention.

FIGS. 2A and 2B illustrate a system capable of simultaneously taking the flying height measurements while detecting contacts with disk asperities in a glide test. The system may include a piezoelectric sensor that measures contact between a slider and an asperity of the disk. The sensor may be mounted to a transparent slider that flies above the disk. The system also contains an interferometer that measures the flying height between the slider and the disk. The system is capable of verifying the flying height of the slider during a glide test of the disk.

The system includes a light source 200 that emits light. The type of light source used depends on the type of interferometric measurements taken. Either monochromatic or color interferometric measurements may be taken. In one embodiment, the system may include a mercury arc light source that produces high intensity wavelengths at 426, 548 and 580 nanometers. In the preferred embodiment, bulbs that emit white light are used. The output of these bulbs are filtered to isolate a specific wavelength or specific wavelengths of light which are used in the interferometric measurements.

The light from light bulb 200 enters an optical support assembly 202 and is channeled through an illuminator condenser system 204. The illuminator condenser system is a system of lenses which collects the light and focuses it into a beam. Such condenser systems are well know in the prior art. A beam splitter 208 directs a portion of the incident radiation towards a second lens system 212 which is again designed to maintain sufficient quantities of radiant energy in a focused beam. The light beam exits out of the optical support assembly 202 after reflecting off mirror 228. Mirror 228 is angled approximately 45 degrees from the normal of the top surface of the slider 244.

A head gimbal assembly 224 provides support and a means for attaching a transparent slider 216 to the optical support assembly 202. The transparent slider may be made from a variety of transparent materials, although in the preferred embodiment, the slider is made of sapphire. A disk 232 is rotated by a spindle 236. As shown in FIG. 2C, rotation of the disk creates an air bearing 240 between the transparent slider 216 and the disk 232. The height of the air gap between the surface of the slider 244 and the surface 248 of the disk 232 may range from contact to approximately 40 microinches.

In one embodiment, when the disk contacts the slider a piezoelectric sensor 249, usually mounted on the slider 216, senses the contact and sends a signal to a processing unit 250 indicating that the slider 216 has struck an asperity on the disk. The sensor reading is a function of the slider to disk impact force. The force of impact correlates to the magnitude of the disk asperity. The output of the piezoelectric sensor is transmitted to the processor 250 which uses the data to compute the existence and height of the disk asperities.

In an alternate embodiment, contact between the transparent slider and disk causes a variation in flying height which is sensed by a photodiode 254. The variation in flying height causes a variation in the intensity of fringes at the slider/disk interface. The photodiode 254 detects the changes in intensity and outputs the information to a processor 250 which analyzes the intensity changes. The intensity changes are used by the processor to determine the variation in slider to disk 232 spacing and when the spacing variations exceed a specified threshold, slider to disk contact is indicated.

Light directed from the lens system 212 reflects off the mirror 228 and passes through the slider 216 at an angle approximately normal to the surface of the slider 244 and the surface of the disk 248. Some of the light is reflected from a surface 244 of the slider 216 at the slider/air bearing interface. The remaining light passes entirely through the slider 216 and reflects off the surface 248 of the rotating disk 232 at an angle approximately normal to the surface 248. The reflected beam of light passes back through the air gap and transparent slider where it combines with the beam reflected from the surface 244 of the slider 216.

Both beams of reflected light pass back through the slider 216, and re-enters the optical support system 202. The dual beams reflect off mirror 228 and pass through lens system 212. A portion of the light passes through beam splitter 208. The portion passing through the beam splitter is filtered by an interference (IF) filter 252. The IF filter determines the wavelength to be used and filters out light from extraneous sources by filtering light which comes in at predetermined angles.

After passing through the IF filter 252, the two beams are separated by a second beam splitter 253 into a first portion which is transmitted to an appropriate light detecting device or detector 254 such as a photodiode and a second portion which is transferred to a second light detecting device such as a charge coupled device (CCD) chip 256. The detector 254 may be a plurality of photodiodes forming a photodiode array. The output of the detector 254 is sent to a processor unit 250 for analysis. The CCD 256 chip is mounted inside a monochrome camera 260. The intensity distribution resulting from the interference pattern from the two beams can be analyzed by a processor unit 250 to determine the air gap 240 between the slider 216 and the disk 232. Repeated measurements of the air gap spacing are taken. The average of these measurements provides an average flying height computation of the gimbal assembly. Contemporaneous measurements from the piezoelectric 249 are also sent to the processor regarding the frequency and magnitude of disk/piezoelectric contacts. The system may have an indicator or a readout that provides an indication of the value of the flying height and/or that the flying height is outside acceptable limits. The flying height value may also be used to determine the height of the asperity.

Although a particular optical path has been described, clearly the optical path can be varied by one of ordinary skill in the art. Specifically, beam splitters, lens systems, and mirrors may be added or removed to accommodate changes in positioning of the slider, camera and illumination source. For example, the optical path may be altered by adding an additional mirror to provide clearance for HGA tooling. Thus the prior description only represents one embodiment of the invention.

Different techniques have been used to analyze and determine information from an interferometric intensity pattern. White light interferometry is sometimes used to determine the head/disk spacing by analyzing the color of the interference fringes. Alternatively, the intensity of monochromatic interference fringes has been used to determine the slider/disk spacing. For both white light and monochromatic interferometry, the difference in phase between two reflected waves is measured.

In monochromatic interferometry, the phase difference determines the spacing of intensity maxima and minima points. Thus by measuring the intensity spacing, the phase difference, and thus the spacing between reflecting surfaces can be measured. The analysis of interference fringe patterns has been discussed in a number of references including the article *Inteferometric Measurement of Disk/Slider Spacing: the Effect of Phase Shift on Reflection* by C. Lacey, R. Shelor, A. Cormier and F. E. Talke in the September/October 93 issue of IEEE Transaction on Magnetics, which is hereby incorporated by reference.

The measurement of slider/disk spacing using various types of interferometry, is well known in the art. In the preferred embodiment, monochromatic light is used. Use of monochromatic light simplifies the analysis and allows a monochrome camera 260 which measures only intensity to be used.

FIG. 3 illustrates an image of the transparent slider shown with interference fringes. The leading edge 304 of the transparent slider 216 is tapered to help provide lift from the air currents generated by the rotating disk. The interference pattern generated includes alternating sequences of dark fringes 308 and light fringes 312. The software which analyzes the fringe pattern should compensate for any dirt 316 on the slider. Dirt appears on the CCD image as dark patches which do not vary in tandem with other portions of the interference pattern despite changes in air bearing or air gap spacing.

The slider itself has a known crown and flies at a pitch so that flying heights of preferably 6 to 13 microinches are realized. At such heights, the slider will be "self calibrating" in that the interferometric minima and maxima will be contained in a single image of the slider as shown in FIG. 3. In such cases, the system will not require any special slider tooling to perform "retract" calibrations.

When using monochromatic light to illuminate the slider/disk interface, the intensity (I) of the light reflected from both surfaces is a function of the light reflected off the disk $r_1$, the light reflected off the slider $r_2$, and the total phase difference between the two waves d. For normally incident light, the intensity equation for the interference pattern is given by:

$$I = \frac{r_1^2 + r_2^2 + 2r_1r_2\cos\delta}{1 + r_1^2r_2^2 + 2r_1r_2\cos\delta}$$

The total phase difference d is given by the equation:

$$\delta = \frac{4\pi h}{\lambda} + 2\pi - \phi_d$$

where h is the slider/disk spacing. l is the wavelength of the incident light and f is the phase shift on reflection.
Thus the total phase difference d is a function of the phase shift on reflection off the disk surface f and the phase difference caused by the difference in path length between the two waves given by the $$\frac{4\pi h}{\lambda}$$

term. The negative sign on $f_d$ is the result of the most commonly used sign convention and the $2\pi$ has been added simply to keep d positive for all values of h. The $2\pi$ could be eliminated with no effect on equation 1. The round trip path length difference of the beam reflected from the slider is twice the slider/disk spacing h.

Equations 1 and 2 can be used to calculate the flying height h because all the other variables (l, $r_1$, $r_2$, $f_d$ and I) are measured or known. l is the wavelength of the incident radiation and is a function of the light source used. $f_d$ is a function of the hard disk. The intensity, "I" can be determined from the intensity measured by the CCD 256. The reflectivity of the various media determine $r_1$ and $r_2$, specifically, $r_1$ is a property of the disk material and $r_2$ is a property of the slider material. The values of $r_1$ and $r_2$ may be calculated using equations (3) and (4) from the intensity minima and maxima measured using the CCD detector. Equations (3) and (4) are as follows:

$$I_{max} = \frac{r_1^2 + r_2^2 + 2r_1r_2}{1 + r_1^2 r_2^2 + 2r_1r_2} \quad (3)$$

$$I_{min} = \frac{r_1^2 + r_2^2 - 2r_1r_2}{1 + r_1^2 r_2^2 - 2r_1r_2} \quad (4)$$

These can be solved simultaneously for $r_1$ and $r_2$ with $I_{max}$ and $I_{min}$ known. From the preceding information, a processor connected to the CCD can determine the only unknown, the flying height h.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus for sensing an asperity of a disk during a glide test, said apparatus comprising:
   a transparent slider that is separated from the disk by an air bearing;
   an interferometer that measures the air bearing by directing a beam of light through said transparent slider; and,
   a piezo-electric sensor to detect when the asperity contacts said slider.

2. The apparatus as recited in claim 1 further comprising a light detecting device to monitor an interference pattern generated by said interferometer.

3. The apparatus as recited in claim 2 further comprising:
   a first beam of light representing a first portion of an original beam of light traveling along a first optical path, the first beam of light representing the first portion of the original beam of light reflected off a surface of said slider;
   a second beam of light representing a second portion of the original beam of light reflected off a surface of said disk;
   a second optical path, guides said reflected second beam of light to a light detecting device;
   a third optical path guides said reflected first beam of light to said light detecting device, said reflected first beam of light and said reflected second beam of light interfere with each other and generate an interference pattern which can be detected by said light detecting device.

4. The apparatus as recited in claim 3 wherein said first optical path includes a illuminator condenser lens system and a beam splitter.

5. The apparatus as recited in claim 3 wherein said second and third optical path significantly overlap and include a mirror, a lens system and an IF filter.

6. The apparatus as recited in claim 3 wherein said light detecting device is connected to a frame grabber which stores the image from said slider for analysis by a processor.

7. The apparatus as recited in claim 1 wherein the disk is opaque.

8. The apparatus as recited in claim 1 wherein a piezo electric sensor is mounted to said transparent slider and senses the asperity contacts between said slider and said disk.

9. The apparatus as recited in claim 1 further comprising:
   a head gimbal assembly supporting said transparent slider.

10. The apparatus as recited in claim 1, wherein said apparatus further comprises:
    a support structure attached to a head gimbal assembly for supporting said transparent slider,
    a transducer mounted at a base end of said head gimbal assembly, said transducer designed to detect movement of the slider due to asperities on the disk during the glide test.

11. The apparatus as recited in claim 1 wherein variations in an interference pattern detected by a detector in said interferometer are used to calculate contacts between said transparent slider and asperities on the disk.

12. A method for optically measuring a slider flying height during a glide test, said method comprising the steps of:
    rotating a disk;
    generating an original beam of light from a light source;
    reflecting a portion of said original beam off a surface of a transparent slider to generate a first beam and transmitting said reflected first beam to a light detecting device;
    reflecting a portion of said original beam off the rotating disk to generate a second beam and transmitting said reflected second beam through said slider;
    imaging said reflected second beam on said light detecting device such that said reflected first beam interferes with said imaged second beam to create an interference pattern,
    analyzing said interference pattern to determine flying height of said slider;
    measuring contacts of a piezoelectric sensor with the rotating disk; and
    combining data from said piezoelectric sensor with flying height data from said interference pattern to determine disk asperities.

13. The method of claim 12 wherein said method further includes the steps of:
    raising the slider off of the disk such that an air gap of less than 15 microinches separates the slider from the disk.

14. The method of claim 12 wherein said method further includes the step of:
    generating disk-slider contact data and glide height data in one rotation of the disk.

15. The method of claim 12 wherein said analysis includes grabbing a frame of said image and storing said frame in memory for further analysis.

16. The method of claim 12 wherein said method further includes the steps of:
    simultaneously taking flying height data and piezoelectric contact data.

17. The method of claim 12 wherein said disk rotates at speeds exceeding 2000 RPM.

18. An apparatus for measuring the height of a slider above a spinning disk during a glide test, said apparatus including:

a light means for emitting an original light beam which is coherent and for directing the original light beam through an optical system and into a slider, a portion of said original light beam reflected from a surface of said slider;

a support means for suspending said slider in close proximity above a spinning disk, said spinning disk reflecting a second portion of said original light beam, a guide means for guiding said second portion of said original light beam to a light detecting means, said second portion of said original light beam interfering with a first portion of said original light beam to create an interference pattern which is measured by said light detecting means;

a processing means for analyzing data from said light detecting means, said processing means determining the spacing between said slider and said spinning disk based on said data;

a contact detecting means which detects contacts between said slider and the spinning disk, said contact detecting means sending a signal to said processing means thereby enabling said processing means to determine disk asperities.

* * * * *